Oct. 9, 1962 J. SNEED 3,057,629
SEALS
Filed May 28, 1954
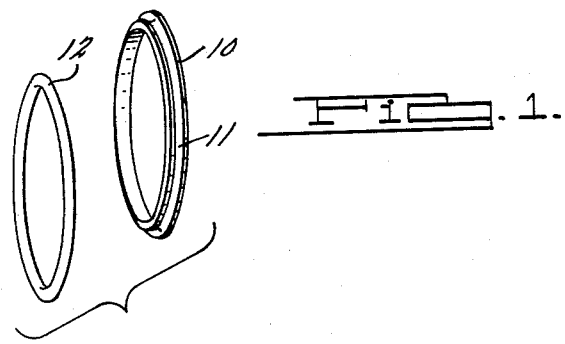
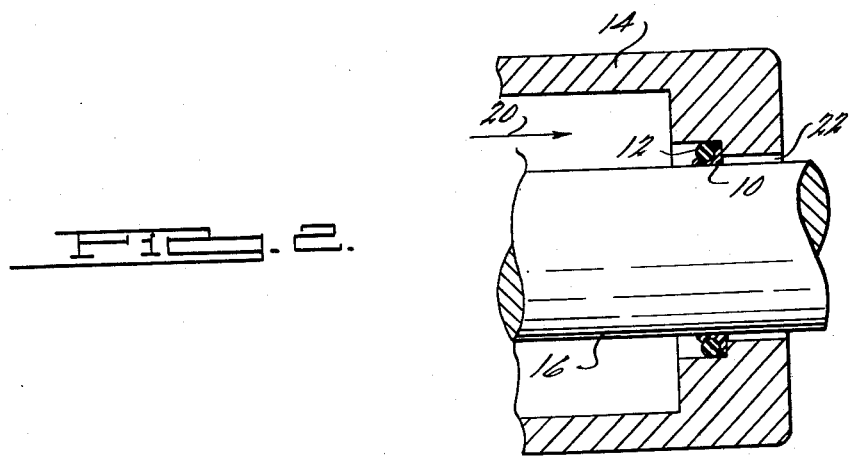
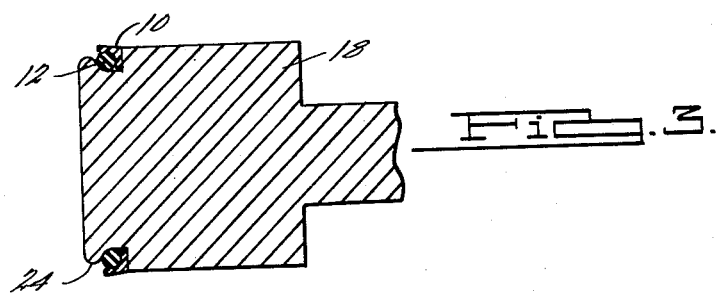
INVENTOR.
John Sneed
BY
Maxwell R. Murphy
ATTORNEY.

3,057,629
SEALS
John Sneed, 18935 Prevost, Detroit 30, Mich.
Filed May 28, 1954, Ser. No. 433,004
8 Claims. (Cl. 277—165)

This invention relates to an improved sealing means for use in any mechanism or apparatus where it is necessary or desirable to provide a seal against escape of fluid pressure around or between rotating or reciprocating parts.

Most seals now available for the purpose mentioned utilize in one way or another some type of "packing" in the form of rawhide, synthetic rubber or the like, which material, being flexible, must be maintained under pressure to do its job and is subject to wear, thus requiring frequent replacement. Such types of seals are unsuitable in places where two parts have high-speed rotation or reciprocation with respect to each other because of the high degree of wear on the flexible members.

I have provided an improved seal of simple construction that is economical to manufacture from materials readily available, and which will withstand high fluid pressures. My improved seal is further characterized by its extremely low friction characteristic and its extremely slow wear.

Other advantages of the invention will become apparent from the following description which, taken in conjunction with the accompanying drawings, discloses a preferred embodiment.

In the drawings,

FIG. 1 is an exploded perspective view of a typical seal assembly drawn full size;

FIG. 2 is a sectional view of a shaft and housing assembly showing a typical use of the seal between relatively rotating parts; and FIG. 3 is a sectional view of a piston assembly showing another typical use of the seal.

Referring now to the drawings, it may be seen that my improved seal consists of two parts, a relatively rigid annulus 10 and a flexible O-ring 12. By the term "rigid," I mean that the annulus is rigid in a relative sense only, some flexibility of the same being essential to the operation of the device, as will presently appear. The annulus 10 is preferably triangular in section and has a groove 11 formed in the hypotenuse side thereof. The groove 11 is of such size that it snugly receives the O-ring 12 which may be stretched slightly to seat in the groove.

The inside diameter of the seal is, of course, the inside diameter of the annulus 10. The outer diameter of the seal is determined by the degree of compression of the O-ring 12, but is in most instances only a few thousandths greater than the outer diameter of the annulus 10.

The annulus 10 is preferably made of "Teflon," "nylon," or other low-friction plastic. These substances are obtainable commercially under the trade-names mentioned and have varying formulas in accordance with the intended use.

The O-ring 12 is preferably formed of synthetic flexible material, such as "neoprene" or the like, which material is commercially obtainable in various formulations.

FIG. 2 shows a typical installation of the seal between a housing 14 and rotating shaft 16. The annulus 10 snugly but rotatably engages the shaft and the O-ring 12 tightly engages the inner diameter of the housing under compression. Fluid pressure effective in the direction of the arrow 20 tends to maintain the O-ring in sealing relation with the housing at all times, the pressure tending to compress the O-ring into elliptical shape in section thereby causing the O-ring to exert force in opposite directions radially of the parts. Because the friction characteristic of the O-ring 12 is higher than that of the annulus 10, the seal will remain stationary with the housing and there will be rotation between the annulus 10 and the shaft 16.

The relatively high strength and rigidity of the annulus 10 will maintain sealing relationship between the parts under conditions when the pressure exerted by the fluid in the direction of the arrow 20 is excessive. This condition is one where my seal demonstrates great superiority over seals of all flexible material. The latter, under conditions of abnormal pressure, tend to expand into the space 22 between the shaft and housing and lose their sealing function.

FIG. 3 shows a typical installation of the seal on the end of a reciprocating piston member 18. It will be understood that the piston is intended to be reciprocated within some kind of housing or cylinder (not illustrated) under influence of or to generate fluid pressure. In this instance, the parts of the seal are reversed, the O-ring being seated in an internal groove in the annulus rather than an external groove. In this example, an annular lip 24 formed on the piston retains the seal in place. The lip 24 is formed such that it will retain the seal against displacement, yet still permit the placement of the seal. The seal is positioned on the piston by dropping one side into the groove, then forcing the other side over the lip 24. In some instances, the annulus 10 may be inserted first and the O-ring placed afterward.

As in the example just described, it will be seen that, once correctly placed, the O-ring will exert radial pressure on the annulus when the parts are assembled, thereby maintaining sealing relationship at all times. The plastic annulus, while relatively rigid as compared with the O-ring, is designed to have some flexibility such that the pressure exerted by the O-ring can expand or contract the diameter of the annulus to provide sealing effect. This is illustrated in somewhat exaggerated form in FIG. 3.

My improved seal is, of course, useful in places where there is no rotation or reciprocation between the parts, and while the annulus 10 has been shown as a plastic member, it may be made of metal or of sintered, oil-impregnated material.

While I have illustrated and described only two of the several forms my invention may assume and have mentioned only a few of the materials from which the seal members may be fabricated, it will be understood that such has been done by way of example and not by way of limitation.

I claim:

1. As a new article of manufacture, a fluid-pressure seal comprising an annular member of flexible, relatively non-compressible, low-friction plastic material having a substantially triangular cross-section, a continuous curvilinear groove in the hypotenuse surface of said member, an O-ring of compressible material seated in said groove under slight tension, at least one edge of said groove being formed with a lip for retaining said O-ring against axial displacement.

2. The combination set forth in claim 1 wherein the outer periphery of said O-ring extends radially outwardly of said grooved member.

3. The combination set forth in claim 1 wherein the inner periphery of said O-ring extends radially inwardly of said grooved member.

4. Improved sealing means adapted to be disposed between two relatively rotating or reciprocating parts comprising a dynamic member and a static member, said dynamic member consisting of an annulus of substantially non-compressible, low-friction plastic material having a substantially cylindrical surface movably engaging one of said parts and having an annular surface angularly disposed with respect to said substantially cylindrical surface engaging the other of said parts and having an annular groove in the angle included between said angularly disposed surfaces, said groove having a depressed part opposite said substantially cylindrical surface, said static member consisting of an O-ring of deformable material disposed in said groove and resiliently retained in said depressed part, said O-ring engaging said other part.

5. In a seal construction, a first part formed with an interiorly directed recess, a second part movable relative to the first part and alongside said recess, a first fluid-seal element formed of flexible material having a low coefficient of friction with the second part and L-shaped in cross section and seated in said recess so that one leg thereof lies along the end of said recess while the other leg flexibly lies along said second part, and a second fluid-seal element formed of resilient material and generally round in cross section and disposed in said recess behind said first element so as to leave the free end of the other leg exposed and so as to be subjected to compressive stresses which make it conform with the surfaces of the first part and of the first element and the first element with the surface of the second part, said second element being forced against the one leg lying along the end of said recess when contacted by fluid under pressure and thereby rendered further effective to make it conform with the surfaces of the first part and of the first element and the first element with the surface of the second part.

6. In a seal construction, a part generally round in cross-section, a second part encompassing said first part so as to mate with it, said parts being relatively movable, an interiorly directed recess formed in one of said parts so as to lie adjacent the mating surface of the other part, a first ring-like fluid-seal element formed of flexible material having a low coefficient of friction with the other part and L-shaped in cross section and seated in said recess so that one leg thereof lies along the end of said recess while the other leg flexibly lies along said other part, and a second ring-like fluid-seal element formed of resilient material and generally round in cross section and disposed in said recess behind said first ring-like element so as to leave the free end of the other leg exposed and so as to be subjected to compressive stresses which make it conform with the surfaces of the one part and of the first element and the first element with the surface of the other part, said second element being forced against the one leg lying along the end of said recess when contacted by fluid under pressure and thereby rendered further effective to make it conform with the surfaces of the one part and of the first element and the first element with the surface of the second part.

7. In a seal construction, a first part formed with an interiorly directed recess, a second part movable relative to the first part and alongside said recess, a first fluid-seal element formed of flexible material having a low coefficient of friction with the second part and L-shaped in cross section and seated in said recess so that one leg thereof lies along the end of said recess while the other leg lies along said second part, and a second fluid-seal element formed of resilient material and generally round in cross section and disposed in said recess behind said first element so as to leave the free end of the other leg exposed and so as to be subjected to compressive stresses which make it conform with the surfaces of the first part and of the first element and the first element with the surface of the second part, said second element being forced against the one leg lying along the end of said recess when contacted by fluid under pressure and thereby rendered further effective to make it conform with the surfaces of the first part and of the first element and the first element with the surface of the second part.

8. In a seal construction, a part generally round in cross-section, a second part encompassing said first part so as to mate with it, said parts being relatively movable, an interiorly directed recess formed in one of said parts so as to lie adjacent the mating surface of the other part, a first ring-like fluid-seal element formed of flexible material having a low coefficient of friction with the other part and L-shaped in cross section and seated in said recess so that one leg thereof lies along the end of said recess while the other leg lies along said other part, and a second ring-like fluid-seal element formed of resilient material and generally round in cross section and disposed in said recess behind said first ring-like element so as to leave the free end of the other leg exposed and so as to be subjected to compressive stresses which make it conform with the surfaces of the one part and of the first element and the first element with the surface of the other part, said second element being forced against the one leg lying along the end of said recess when contacted by fluid under pressure and thereby rendered further effective to make it conform with the surfaces of the one part and of the first element and the first element with the surface of the second part.

References Cited in the file of this patent

UNITED STATES PATENTS

| 1,969,797 | Hubbard et al. | Aug. 14, 1934 |
| 2,202,908 | Hubbard | June 4, 1940 |
| 2,494,598 | Waring | Jan. 17, 1950 |
| 2,708,573 | Rovoldt | May 17, 1955 |
| 2,728,620 | Krueger | Dec. 27, 1955 |
| 2,746,781 | Jones | May 22, 1956 |
| 2,760,794 | Hartranft | Aug. 28, 1956 |
| 2,825,590 | Sutherland | Mar. 4, 1958 |

FOREIGN PATENTS

| 646,249 | Great Britain | Nov. 15, 1950 |
| 704,117 | Great Britain | Feb. 17, 1954 |
| 1,049,256 | France | Aug. 19, 1953 |
| 224,101 | Great Britain | Nov. 6, 1924 |
| 170,175 | Austria | Jan. 25, 1952 |